Oct. 31, 1967    H. D. TERHUNE ET AL    3,349,634
TRANSMISSION BELT AND METHOD OF MANUFACTURE
Filed April 13, 1965    3 Sheets-Sheet 1

INVENTORS
HUGH D. TERHUNE
DALE L. WAUGH
BY
ATTORNEY

Oct. 31, 1967 H. D. TERHUNE ET AL 3,349,634

TRANSMISSION BELT AND METHOD OF MANUFACTURE

Filed April 13, 1965 3 Sheets-Sheet 2

INVENTORS
HUGH D. TERHUNE
DALE L. WAUGH
BY
Reuben Wolk
ATTORNEY

Oct. 31, 1967  H. D. TERHUNE ET AL  3,349,634
TRANSMISSION BELT AND METHOD OF MANUFACTURE
Filed April 13, 1965  3 Sheets-Sheet 3
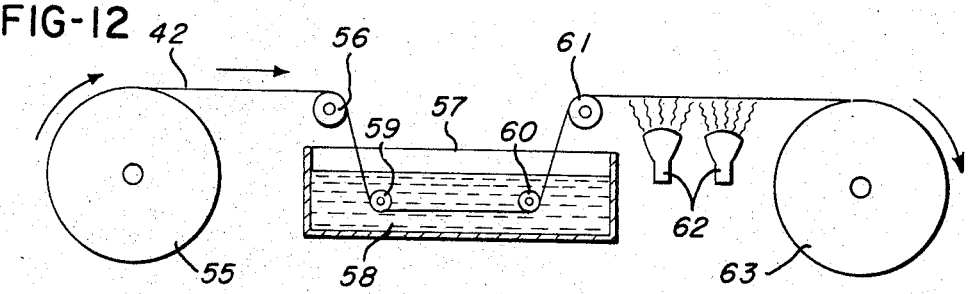
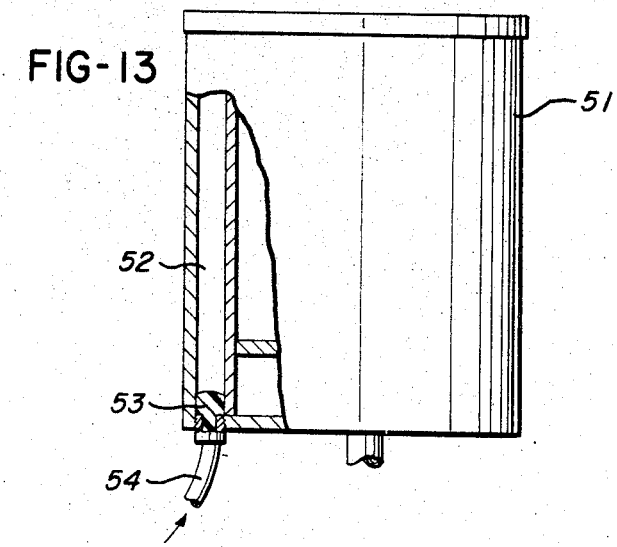
INVENTORS
HUGH D. TERHUNE
DALE L. WAUGH.
BY
Reuben Wolk
ATTORNEY United States Patent Office
3,349,634
Patented Oct. 31, 1967

3,349,634
TRANSMISSION BELT AND METHOD
OF MANUFACTURE
Hugh D. Terhune and Dale L. Waugh, Springfield, Mo., assignors to Dayco Corporation, Dayton, Ohio, a corporation of Ohio
Filed Apr. 13, 1965, Ser. No. 447,720
5 Claims. (Cl. 74—231)

ABSTRACT OF THE DISCLOSURE

A power transmission belt having a urethane elastomer body and strength cords embedded therein, the cords impregnated with a dip material, and the elastomer only partially penetrating the cords.

---

This invention relates to a transmission belt of the type used for transmitting power from a driving to a driven member, as well as to a method of manufacturing such a belt.

In the field of power transmission many types of belts have been developed, and one of the most recent of these is a belt formed of a castable synthetic material. Such a material, particularly when selected from the urethane elastomer group, provides many advantages in wear resistance which are desirable and also lends itself to simplicity in manufacture. This is primarily due to the fact that, unlike rubber, these synthetic materials may be prepared in liquid form and cast or molded until achieving the solid finished state.

It has been known in the prior art to cast such belts as, for example, described by Beckadolph in United States Patents No. 3,068,710 and No. 3,114,598, and as also described by Schmidt in United States Patent No. 2,983,637. In the prior art, such belts are formed by the use of an inner mold member inserted within an outer one, the strength cord having been previously wound on the inner mold. The urethane liquid is then poured into the annular space between the molds and allowed to set in the final solid form. These patents described the most simple method of manufacturing belts of this type.

As a variation of this method, Haines in his United States Patent No. 3,138,962 describes a method whereby the mold upon assembly is subjected to a vacuum pressure in the annular space in order to pull some of the liquid synthetic elastomer completely through the strength cords and thereby achieve a complete bond of all members.

In the present invention applicants have approached the problem of forming a synthetic castable elastomeric belt in a different manner, utilizing centrifugal force to create an even distribution of the elastomeric materials throughout the annular space in order to achieve a constant density throughout. This centrifugal casting, therefore, provides a considerable difference over the processes described in the above-referenced patents. Applicants further have departed from these prior art methods in that the strength cord is not completely impregnated as described by Haines, but instead is either surface bonded or bonded by a very shallow penetration into the outer fibers which comprise the cord. This has been found to provide a more desirable belt as a finished product.

It is, therefore, a principal object of the invention to provide a transmission belt having a constant density.

It is a further object to provide such a belt in which the strength cord is bonded to the surrounding portion of the belt at its surface or slightly below the surface of the cord.

It is a further object to provide a method for manufacturing such a belt by centrifugal casting.

It is a further object of the invention to provide various novel means of filling the mold.

These and other objects of the invention will be more fully described in the following specification and accompanying drawings, in which:

FIGURE 12 is a schematic view of a belt cord dipping process.

FIGURE 13 is an elevational view similar to FIGURE 2 illustrating another method of filling the mold.

Figure 1:
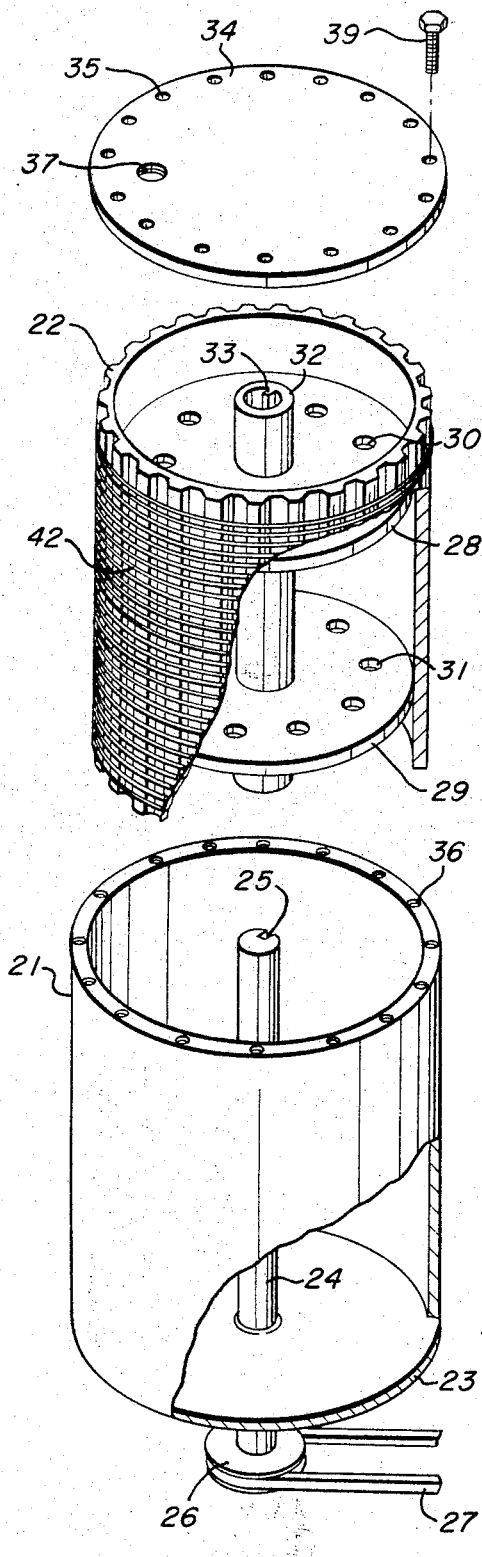
FIGURE 1 is an exploded perspective view of a preferred form of the mold for manufacturing the belt.

Referring now to FIGURE 1, a typical mold assembly is illustrated in exploded perspective which consists of outer mold member 21, inner mold member 22, and a cover 34. The outer mold member 21 consists of a cylindrical wall formed of steel, aluminum, or other suitable metal, and a bottom surface 23 formed of similar material. Mounted on the inner surface of the bottom 23 is a rod or shaft 24 which extends upwardly of the wall 22. A keyed slot 25 extends throughout the length of this rod. The rod 24 also extends through the bottom 23 and terminates a short distance below; mounted thereon is a pulley 26 which may be actuated by a transmission belt 27.

The inner mold member 22 also consists of a cylindrical wall which has a smooth interior surface but a corrugated exterior surface extending throughout its length. A pair of circular plates 28 and 29 are mounted within the wall and attached thereto, as by welding, and contain respectively a plurality of apertures 30 and 31 therein. Centrally of these plates is mounted a hollow shaft 32 which is secured to the plates by some permanent means as by welding. A key 33 extends throughout the length of the shaft at the inner hollow surface thereof for the purpose of locking with the slot 25 of the shaft 24 of the outer mold member. The cover 34 is adapted to be placed over the upper surface of the outer mold member 21, and for this purpose has a series of threaded apertures 35 which align with a number of similarly threaded openings 36 within the wall 22 of the outer mold member. Also located in the cover 34 is a pour opening 37 which is threaded.

In the manufacture of the novel belt the first step consists of helically winding a belt cord 42 around the outer corrugated surface of the inner mold member 22. The cord will be wound so that the adjacent turns are axially spaced from each other which causes them to lie across the vertically extending corrugations of the mold member. The cord is of the type normally used in the manufacture of belts, such as cotton, nylon, rayon, or polyester (such as sold by Du Pont under the trade name Dacron, and often more fully described as a condensation polymer of ethylene glycol and terephthalic acid). Although this cord may be untreated, it is preferably dipped as described below. The cord is made up of individual strands which have been wrapped together, each of these strands in turn being made up of a number of individual fibers.

Figure 2:
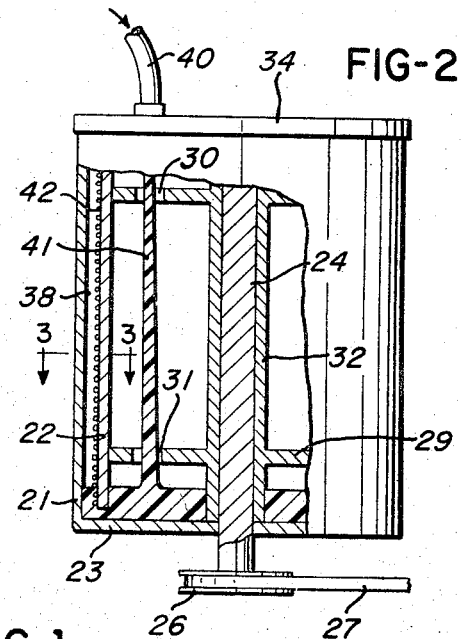
FIGURE 2 is an elevational view in partial cross section illustrating the assembled mold during the processing.
Figure 3:
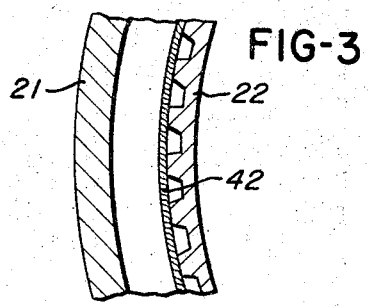
FIGURE 3 is a section taken along lines 3—3 of FIGURE 2.
Figure 4:
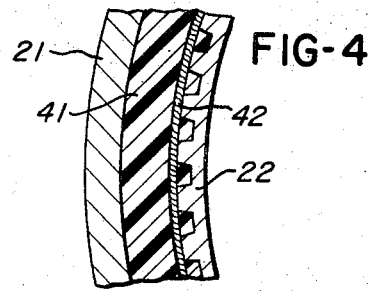
FIGURE 4 is a sectional view similar to FIGURE 3 after molding has been completed.

After the cord has been completely wrapped about the inner mold member, the mold member is inserted within the outer mold member and the interrelationship of the key 33 and the slot 25 will create a constant relationship of the two mold members. This in turn will create an annular space 38 as shown in FIGURE 2 which will be constant around the entire periphery of the molds. The cover 34 is then placed on the mold and secured to the outer mold member wall by means of bolts 39. A filler tube 40 is then attached to the filling hole 37 so that the liquid elastomer 41 may be poured within the mold. As can be seen in FIGURE 2, a predetermined amount of the liquid synthetic material 41 is poured through the apertures 31 of the plates 29 and 30 until it strikes the bottom 23 of the outer mold.

Figure 5:
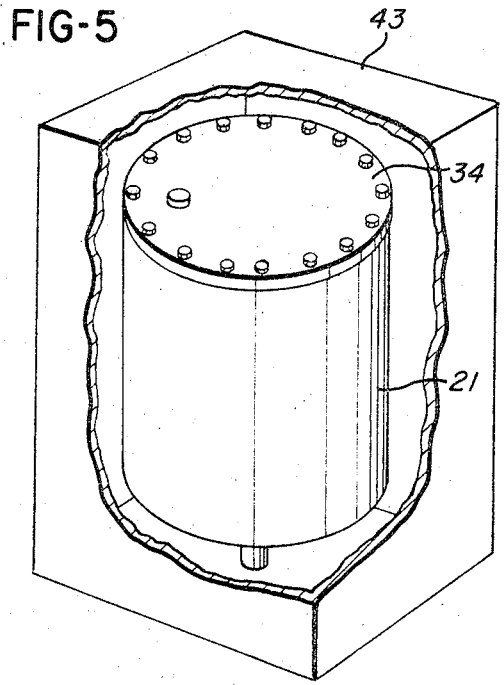
FIGURE 5 is a perspective view illustrating the step of curing the belt in the mold.

It is possible to utilize many types of liquid castable synthetic materials such as polyamides, polyester resins, or epoxy resins. The preferable material to be used, however, is liquid castable urethane which provides the desired properties as wear and abrasion resistance together with the necessary flexibility. While a number of such materials are available, a typical material may be prepared as follows. The principal ingredient is a liquid urethane resin such as Adiprene L-100 (Du Pont) to which is added an aromatic diamine curing agent such as 4,4'-methylene bis (2-chloroaniline). The preferable proportion is 100 parts of the Adiprene to 11 parts of the curing agent. These materials are mixed together, heated and then degassed by pouring into a vacuum pot which removes all the bubbles of air or other gases that are present. This liquid is then poured through the filler tube 40 into the mold as described, the filler tube is removed, and a cap inserted in the aperture 37. As is noted in FIGURE 2, the wall 28 of the inner mold is elevated above the bottom 23 of the outer mold, thereby providing a gap so that the liquid material 21 may flow into the annular space 38. The entire assembly of inner and outer mold members and the cover may then be simultaneously spun because they are locked as described. By driving belt 27 from a power source (not shown) the assembly may be spun at a comparatively low speed, say in the range of 200 to 300 r.p.m., for approximately 30 minutes. The centrifugal action will cause the liquid material 41 to flow upward and completely fill the annular space and surround the cord 42. At the end of this time the liquid has gelled so that it is self-supporting, although it has not become completely cured. The entire mold assembly is then placed in an oven 43 and cured at a temperature of approximately 250° F. for about 30 minutes as shown in FIGURE 5. This curing method, of course, is only one of many that may be employed; for example, induction heat may be applied to the mold in place, thus eliminating the need for an oven.

Figure 6:
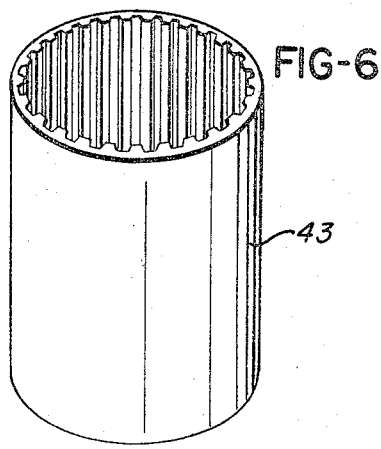
FIGURE 6 is a perspective view of a belt sleeve upon removal from the mold.
Figure 7:
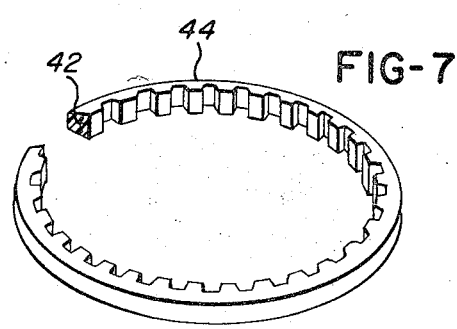
FIGURE 7 is a perspective view of a belt which has been cut from the belt sleeve of FIGURE 6.
Figure 8:
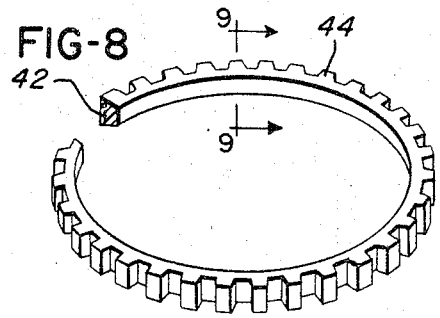
FIGURE 8 is a perspective view of the belt of FIGURE 7 upon being inverted.
Figure 9:
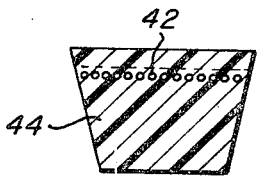
FIGURE 9 is a sectional view of the belt taken along lines 9—9 of FIGURE 8.
Figure 10:
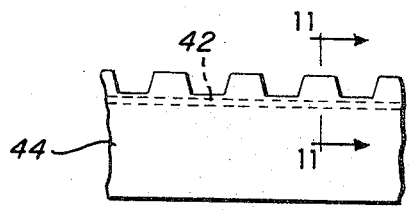
FIGURE 10 is a fragmentary elevational view of the belt of FIGURES 8 and 9.

Upon completion of the curing process the mold is allowed to cool to room temperature, all components are disassembled, and the cured sleeve 43, as shown in FIGURE 6, is removed from the mold. This consists of a continuous cylindrical member formed of the elastomer in which the cord 42 is completely enveloped. It is noted that the sleeve has a corrugated internal surface and a smooth external surface. This sleeve is cut into the shape of an inverted V-belt 44 as shown in FIGURE 7, which may be done by any of the conventional belt cutting mechanisms such as that described in Lomazzo et al. United States Patent No. 2,661,579. This individual belt is then inverted to form the final belt having a corrugated outer surface as shown in FIGURE 8, which has the trapezoidal cross section as better shown in FIGURE 9, in which the cords 42 are disposed adjacent the internal surface of the corrugations as also shown in FIGURES 9 and 10. This finished product is now ready for use as a transmission belt.

Figure 11:
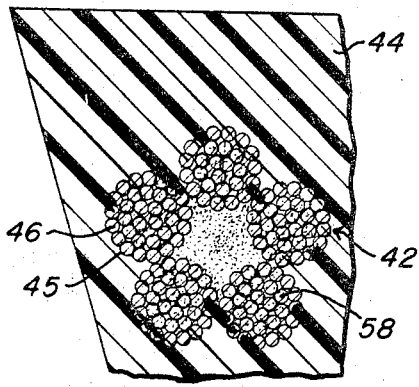
FIGURE 11 is an enlarged sectional view of one form of the finished belt taken along lines 11—11 of FIGURE 10.

FIGURE 11 illustrates the relationship of the cord 42 within the belt. As was discussed above, the conventional belt cord consists of a number of individual strands designated by reference numeral 45 which are intertwined to form the cord, and each of these strands is in turn composed of individual small diameter fibers 46. It has been found that the liquid elastomer which comprises the belt will create a partial or very shallow penetration of the individual strands 45 as shown in FIGURE 11, sufficiently to create a tight bond of these strands within the belt. However, a complete penetration through the fibers will not occur nor would such a penetration be desirable. Applicants have found that such a complete penetration will tend to make a solid mass of the cords and the belt and reduce the elasticity; by contrast, the partial penetration permits the interior fibers of each strand to move freely and thereby promote elasticity of the belt. The partial penetration is controlled by processing the cord prior to wrapping it around the inner mold member. The processing, as illustrated in FIGURE 12, involves a pre-dipping procedure whereby the cord 42 is taken off a spool 55 and passes over a roller 56 into a tank 57 containing the dip material 58. This material is in effect an adhesive in a solvent carrier, and during the dipping process the material thoroughly impregnates the fibers. The cord is conveyed under rollers 59 and 60 and over roll 61, passes over drying members such as heat lamps 62, and is taken up on spool 63, from which it is subsequenty processed into the belt sleeve as described above. Since the interior of these cords is now filled with a mass of the material 58, as shown in FIGURE 11, the elastomeric material 41 will only partially penetrate into the body of the strands 45 or the fibers 46, in order to create a bond with the cords. The depth of penetration will be no more than about 10% of the diameter of the cords.

In describing the formation of the belt above, the liquid synthetic material was poured into the mold, and gravity was utilized to accumulate the material on the bottom of the mold until the casting process caused it to flow upward. As a variation of this method, it is possible to add the liquid material by connecting the mold to an injection molding or transfer molding machine which will then supply the material under pressure into the annular space. The material may be applied at the top of the annular space or as shown in FIGURE 12, at the lower portion. In this case the mold which is designated by reference numeral 51 has an annular space 52 and the liquid synthetic material 53 is introduced at the bottom of the annular space through the inlet pipe 54 which is connected to one of the mechanisms referred to. When the charge of material has been completely discharged, the pipe is disconnected and a plug inserted at the bottom of the mold, with the ensuing process carried out as above.

It is thus seen that according to the method described above, a belt sleeve may be centrifugally cast and the process which is utilized will create a surface or partial bonding of the belt cord to the principal portion of the belt. It should be further noted that although the mold described above creates a unitary sleeve which must be subsequently cut, it is also possible to case semi-individual belt bodies by forming the inner surface of the outer mold in the form of a divider such as described in the above-mentioned Patent No. 3,138,962. This will result in partially separated belts which will only have to be cut through the cord portion for separation.

Other variations in the above-described processes, and other belt configurations are contemplated as falling within the scope of the invention.

What is claimed is:
1. A power transmission belt comprising a body of urethane elastomer and a plurality of longitudinally extending strength cords embedded within said body, said cords impregnated with an adhesive dip material, said urethane elastomer only partially penetrating said cords to form a bond therewith.

2. The belt of claim 1 in which said urethane elastomer penetrates said cords to a maximum depth of 10% of the cord diameter.

3. The belt of claim 1 in which said cords comprise a plurality of individual strands.

4. The belt of claim 3 in which each of said strands is composed of a plurality of fibers.

5. A power transmission belt comprising a body of cast urethane elastomer having a corrugated outer surface, a plurality of longitudinally extending strength cords embedded in said body adjacent the internal surface of said corrugations, said cords impregnated with an adhesive dip material, said urethane elastomer only partially penetrating said cords to form a bond therewith.

References Cited

UNITED STATES PATENTS

| | | | |
|---|---|---|---|
| 2,491,188 | 12/1949 | Lesesne | 74—232 |
| 2,522,115 | 9/1950 | Harper | 74—232 X |
| 2,983,637 | 5/1961 | Schmidt | 74—232 X |
| 3,068,710 | 12/1962 | Beckadolph et al. | 74—237 |
| 3,138,962 | 6/1964 | Haines et al. | 74—231 |
| 3,140,620 | 7/1964 | Ferara. | |

MILTON KAUFMAN, *Primary Examiner.*

DAVID J. WILLIAMOWSKY, FRED C. MATTERN, *Examiners.*

J. A. WONG, *Assistant Examiner.*